United States Patent [19]

Sugano

[11] Patent Number: 5,301,309
[45] Date of Patent: Apr. 5, 1994

[54] DISTRIBUTED PROCESSING SYSTEM WITH CHECKPOINT RESTART FACILITIES WHEREIN CHECKPOINT DATA IS UPDATED ONLY IF ALL PROCESSORS WERE ABLE TO COLLECT NEW CHECKPOINT DATA

[75] Inventor: Hiroshi Sugano, Oome, Japan

[73] Assignee: Kabushiki Kaisha Toshiba, Kawasaki, Japan

[21] Appl. No.: 514,026

[22] Filed: Apr. 27, 1990

[30] Foreign Application Priority Data

Apr. 28, 1989 [JP] Japan .................................. 1-110544

[51] Int. Cl.⁵ ............................................. G06F 11/00
[52] U.S. Cl. .............................. 395/575; 364/DIG. 1; 364/285.2; 364/285
[58] Field of Search .................. 364/DIG. 1 MS File, 364/DIG. 2 MS File; 395/200, 325, 375, 575, 650, 700, 800; 371/12, 13, 9, 8, 7, 16.5

[56] References Cited

U.S. PATENT DOCUMENTS 4,665,520 5/1987 Strom et al. ............................. 371/7
4,816,989 3/1989 Finn et al. .................... 364/DIG. 1

Primary Examiner—Robert B. Harrell
Attorney, Agent, or Firm—Cushman, Darby & Cushman

[57] ABSTRACT

Data processors, each comprising a distributed processing system, include means for executing checkpoint restart processing synchronously with each other. Each of the data processors erases old checkpoint data when it can execute restart processing based on new checkpoint data. When one of the data processors cannot execute the restart processing based on the new checkpoint data, the other of the data processors executes the restart processing based on the old checkpoint data synchronously with the one of the data processors.

6 Claims, 5 Drawing Sheets

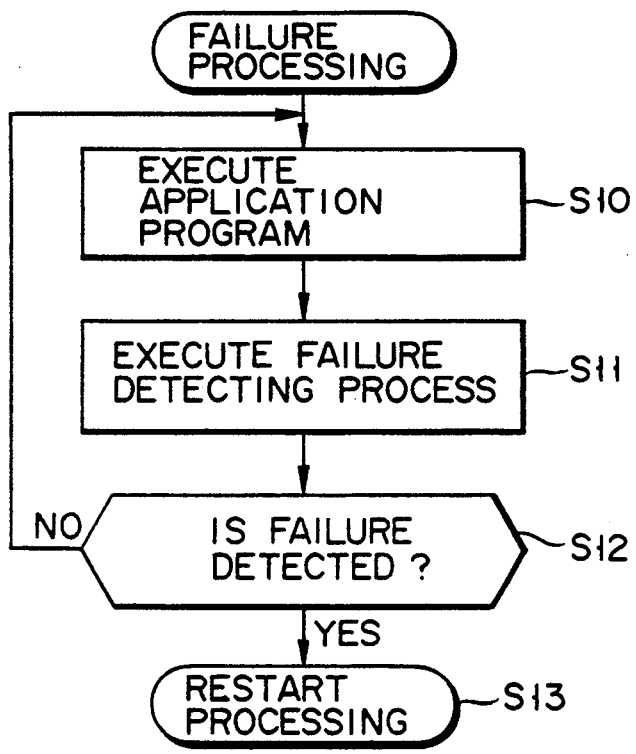
F I G. 4

DISTRIBUTED PROCESSING SYSTEM WITH CHECKPOINT RESTART FACILITIES WHEREIN CHECKPOINT DATA IS UPDATED ONLY IF ALL PROCESSORS WERE ABLE TO COLLECT NEW CHECKPOINT DATA

BACKGROUND OF THE INVENTION

1. Field of the Invention

The present invention relates to checkpoint restart facilities installed in each of a number of data processors which are interconnected to form a distributed processing system.

2. Description of the Related Art

A distributed processing system is a system in which a plurality of data processors are interconnected by communication lines so that data transmission and reception can occur among the data processors. With such a system, the data processors can share data and execute distributed processing of an application program.

In a data processing system, checkpoint restart facilities are well known in which, when a system failure occurs in the system, processing is allowed to continue from the last checkpoint of a program which has normally been executed before the system failure occurs. The facilities save information (i.e., checkpoint data) necessary to restart the execution of a program from that point in the program execution at which the information is saved.

In the distributed processing system, each of the data processors has the checkpoint restart facilities and independently executes its checkpoint restart facilities to recover from a failure.

In the distributed processing system, however, with data transmission and reception performed between data processors, even if one of the data processors operates properly, a system failure may occur in another data processor. In such a case, the following problem will arise when each of the data processors independently performs the checkpoint restart facilities as described above. That is, with data transmitted from one data processor to another data processor, when a failure occurs in the former, it will execute the checkpoint restart facilities to continue processing from a point prior to occurrence of the failure. In this case, the latter which functions properly does not recognize that the restart facilities has been executed in the former and thus will not identify whether data transmitted from the former is data transmitted prior to occurrence of the failure or is fresh data. Therefore, a situation in which no data necessary for the current processing is transmitted to the latter may take place, and a malfunction may occur in data communication. This will lower the reliability of the distributed processing system.

SUMMARY OF THE INVENTION

It is therefore an object of the present invention to provide a distributed processing system with checkpoint restart facilities which allows each of a number of data processors comprising the system to execute the checkpoint restart facilities synchronously with another data processor in the system to prevent difficulties from arising in data transmission and reception among the data processors.

According to the present invention there is provided a distributed processing system with restart processing facilities comprising: communication control means, which are installed in each of a plurality of data processors constituting said system and which execute a predetermined program, for allowing transmission and reception of data between said data processors; checkpoint processing means for causing one of said data processors to request another data processor to collect checkpoint data via said communication control means and for determining, based on the response from the other data processor, the values of checkpoint data necessary for restart processing data storage means installed in each of said data processors for storing the checkpoint data determined by said checkpoint processing means; and restart processing means installed in each of said data processors for restarting said program on the basis of the checkpoint data stored in said data storage means.

Additional objects and advantages of the invention will be set forth in the following description, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a flowchart for explaining the contents of the failure processing in the embodiment of FIG. 1.

DETAILED DESCRIPTION OF THE PREFERRED EMBODIMENT

Figure 1:
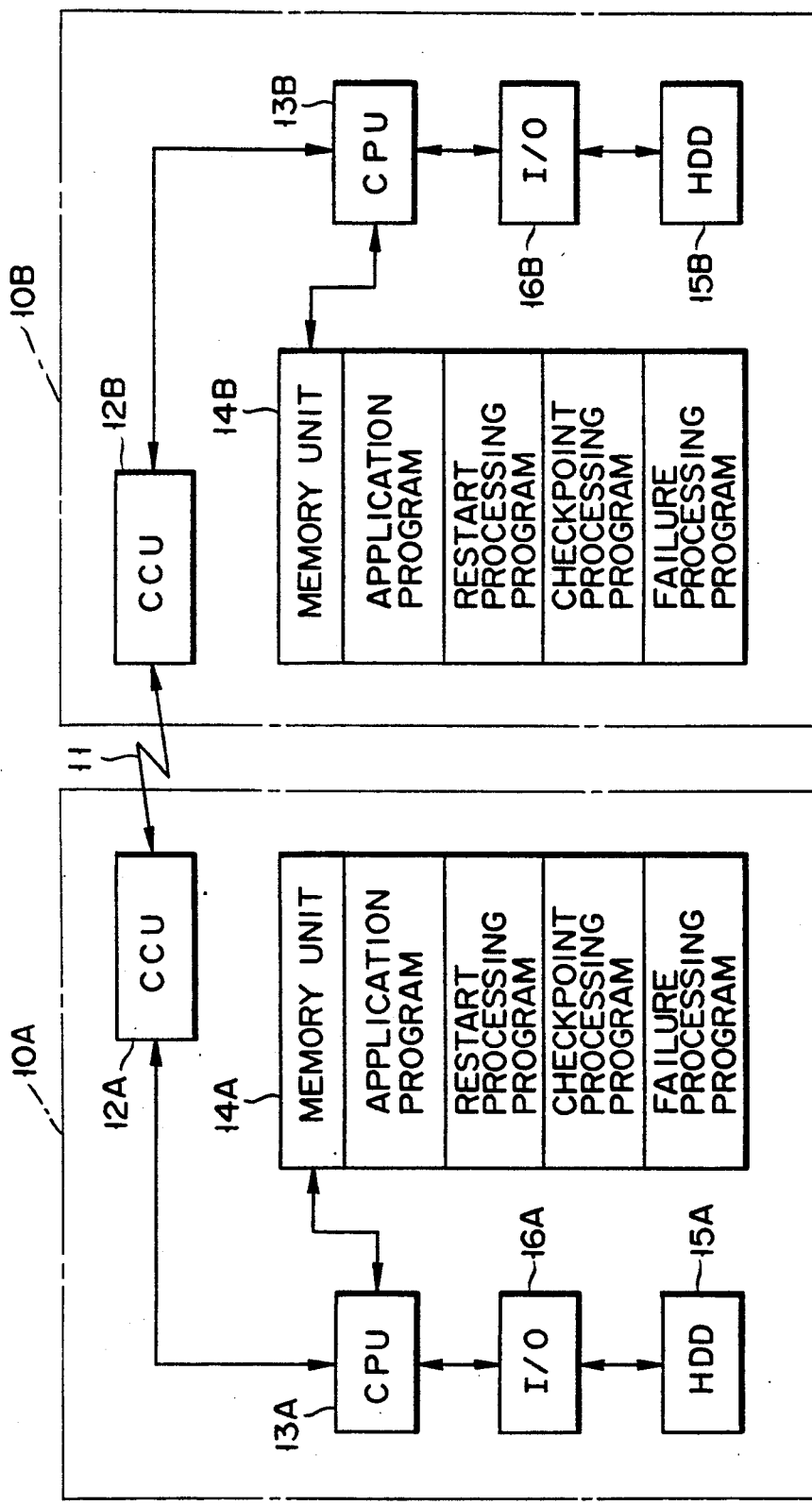
FIG. 1 is a block diagram of a distributed processing system embodying the present invention.

Referring now to FIG. 1, a distributed processing system according to an embodiment of the present invention is comprised of a plurality of data processors 10A and 10B which are interconnected by a communication line 11 so that data is transmitted and received between the data processors. Each of data processors 10A and 10B serve as a node of a computer network.

Data processor 10A comprises: a communication control unit (CCU) 12A, a central processing unit (CPU) 13A and a memory unit 14A which stores various application programs. CCU 12A transmits and receives data over communication line 11 under the control of CPU 13A. CPU 13A executes various types of data processing, such as checkpoint processing, failure processing and restart processing, associated with the present embodiment on the basis of the programs stored in memory unit 14A. Data processor 10A is further provided with a hard-disk drive (HDD) 15A serving as a filing system. CPU 13A writes into or reads from HDD 15A via an I/O interface 16A. HDD 15A has an area for storing checkpoint data associated with the present embodiment.

Data processor 10B likewise comprises a CCU 12B, a CPU 13B, a memory unit 14B, an HDD 15B, and an I/O interface 16B. CCU 12B is connected to CCU 12A through communication line 11 to receive data from and send data to data processor 10A. CPU 13B, memory unit 14B, HDD 15B and I/O interface unit 16B have the same functions as the corresponding components in data processor 10A.

In such a system, CPU 13A of data processor 10A executes given data processing corresponding to an application program stored in memory unit 14A, while CPU 13B of data processor 10B executes given data processing corresponding to an application program stored in memory unit 14B. At this point CPU 13B is executing distributed processing of a given job together with CPU 13A. CPU 13A and CPU 13B transmit and receive data between themselves via communication line 11.

With such distributed processing executed by data processors 10A and 10B, if a system failure occurs, the processing by CPU 13A and CPU 13B is temporarily stopped. To recover from the system failure, checkpoint restart processing is executed. That is, as shown in FIG. 4, CPU 13A and CPU 13B execute a failure detecting process based on the program stored in memory units 14A and 14B (step S11) while executing an application program (step S10). When the system failure is detected by the failure detecting process, the check point restart process is executed (steps S12, S13).

Next, the checkpoint restart process will be described with reference to FIGS. 2, 3 and 5.

Figure 2:
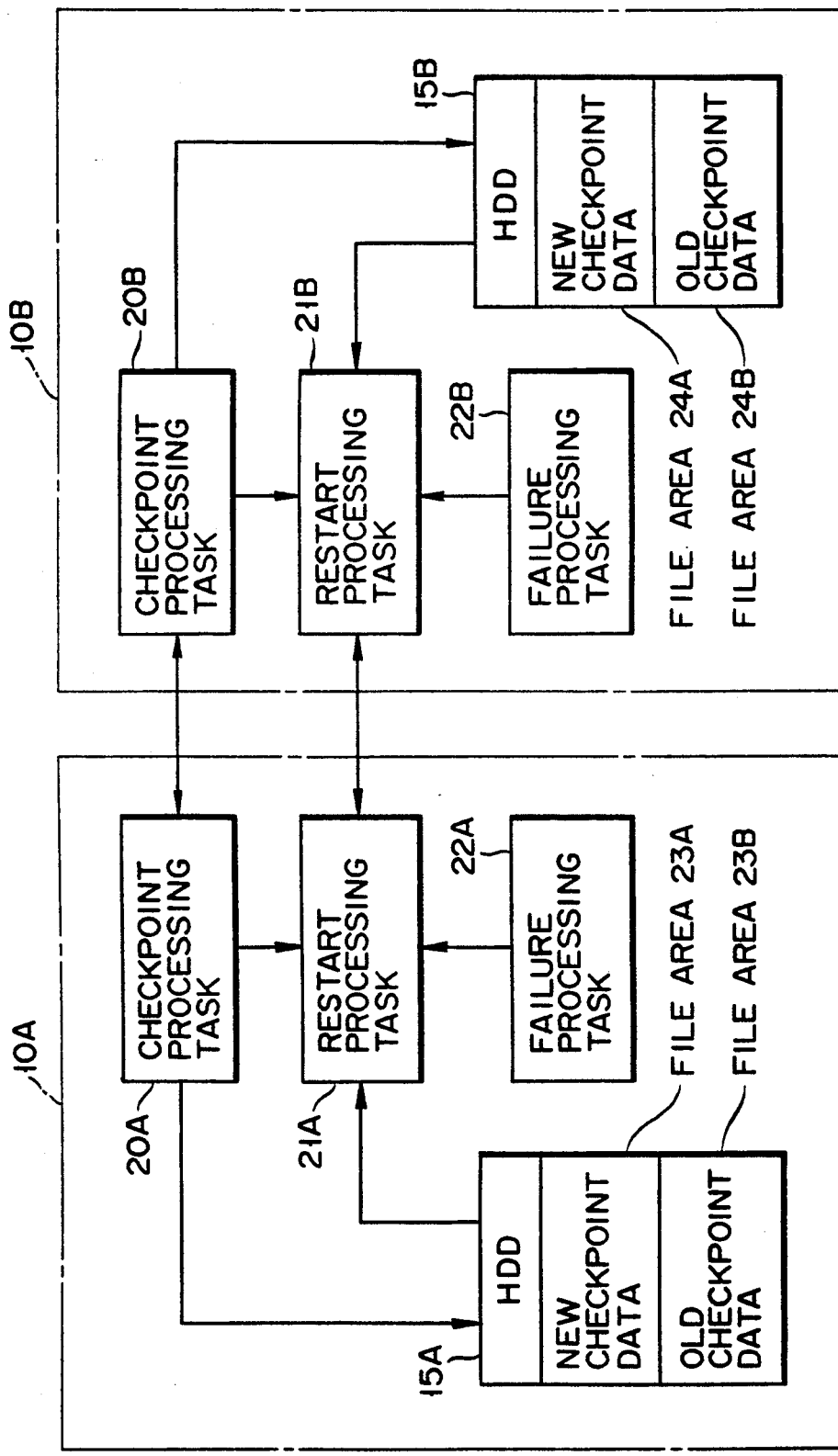
FIG. 2 is a conceptual block diagram illustrating the restart processing means in the embodiment of FIG. 1.

FIG. 2 is a conceptual diagram of means for executing the checkpoint restart processing. That is, in each of data processors 10A and 10B, failure processing tasks 22A and 22B execute the system failure detecting process. Restart processing tasks 21A and 21B executes the checkpoint restart processing in response to detection of the system failure by failure processing tasks 22A and 22B. Checkpoint processing tasks 20A and 20B executes a process of determining data necessary for restart processing. Tasks 20A, 21A and 22A described herein respectively correspond to execution by CPU 13A of the restart processing program, the checkpoint processing program and the failure processing program, which are all stored in memory unit 14A. Likewise tasks 20B, 21B and 22B respectively correspond to execution by CPU 13B of the restart processing program, the checkpoint processing program and the failure processing program, which are all stored in memory unit 14A.

HDD 15A in data processor 10A has a file area 23A for storing the latest checkpoint data at the time of the occurrence of the system failure and a file area 23B for storing the old data prior to the occurrence of the system failure. Likewise HDD 15B in data processor 10B has a file area 24A for storing the latest checkpoint data at the time of the occurrence of the system failure and a file area 24B for storing the old data prior to the occurrence of the system failure.

Figure 3:
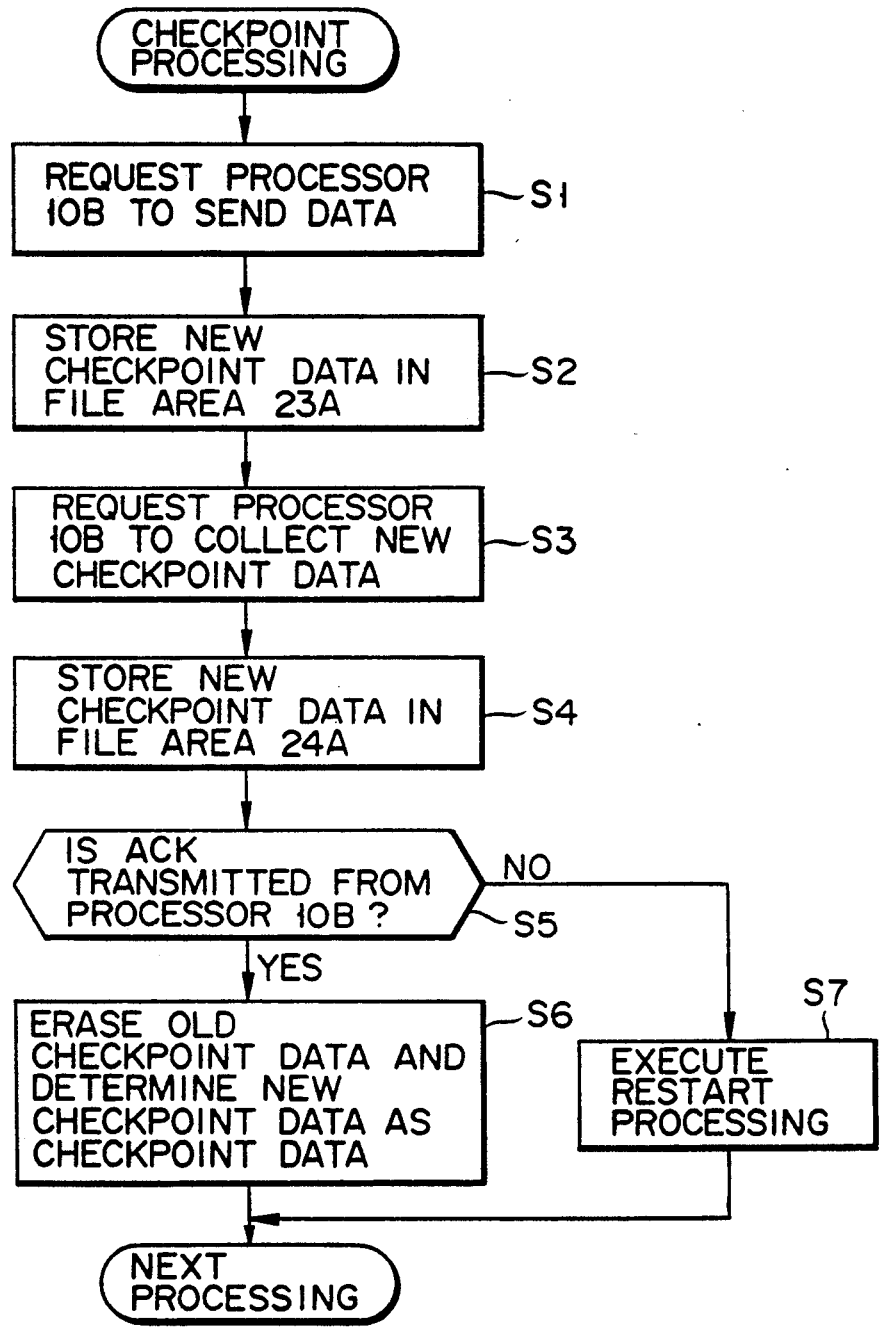
FIG. 3 is a flowchart for explaining the contents of the checkpoint processing in the embodiment of FIG. 1.

Checkpoint processing tasks 20A and 20B execute a process as indicated in FIG. 3. For example, when the distributed processing is being executed by data processors 10A and 10B, data processor 10A executes a step S1 of requesting data processor 10B to send data associated with the distributed processing. That is, CPU 13A executes an application program and prompts CPU 13B, via communication line 11, to send data associated with the data processing. At this point checkpoint processing task 20A stores new checkpoint data in file area 23A (step S2). The contents of the checkpoint data comprise a program status word (PSW) representing variable information (e.g., parameters) necessary to make a restart of the application program which has been stopped by the system failure. At this point file area 23B stores old checkpoint data which was collected by checkpoint processing task 20A prior to the present time.

Next, checkpoint processing task 20A requests checkpoint processing task 20B of data processor 10B to collect new checkpoint data for the program executed by CPU 13B in accordance with the request to send data (step S3). That is, task 20A transmits to task 20B ID information the state of the variables in the program that CPU 13A is executing and requests task 20B to collect new checkpoint data in a program to be executed by CPU 13B. Task 20B in data processor 10B collects the new checkpoint data as requested by task 20A and stores it in file area 24A of HDD 15B (step S4). At this time task 20B identifies, using the ID information from task 20A, the program that CPU 13B executes in response to the request to send from CPU 13A and collects the new checkpoint data of the program. The old checkpoint data collected previously by checkpoint processing task 20B in file area 24B of HDD 15B is stored.

In response to reception of an ACK (acknowledgment) from task 20B of data processor 10B, task 20A of data processor 10A decides whether or not data processor 10B has normally received data from data processor 10A (step S5). In other words, task 20B transmits an ACK to task 20A when the collection of the new checkpoint data as requested by task 20A was made successfully, but transmits no ACK when it was made unsuccessfully.

When the ACK is transmitted from task 20B, task 20A erases the old checkpoint data stored in file area 23B and designates the new checkpoint data stored in file area 23A as the current checkpoint data (step S6). Likewise task 20B erases the old checkpoint data stored in file area 24B and designates the new checkpoint data stored in file area 24A as the current checkpoint data.

Figure 5:
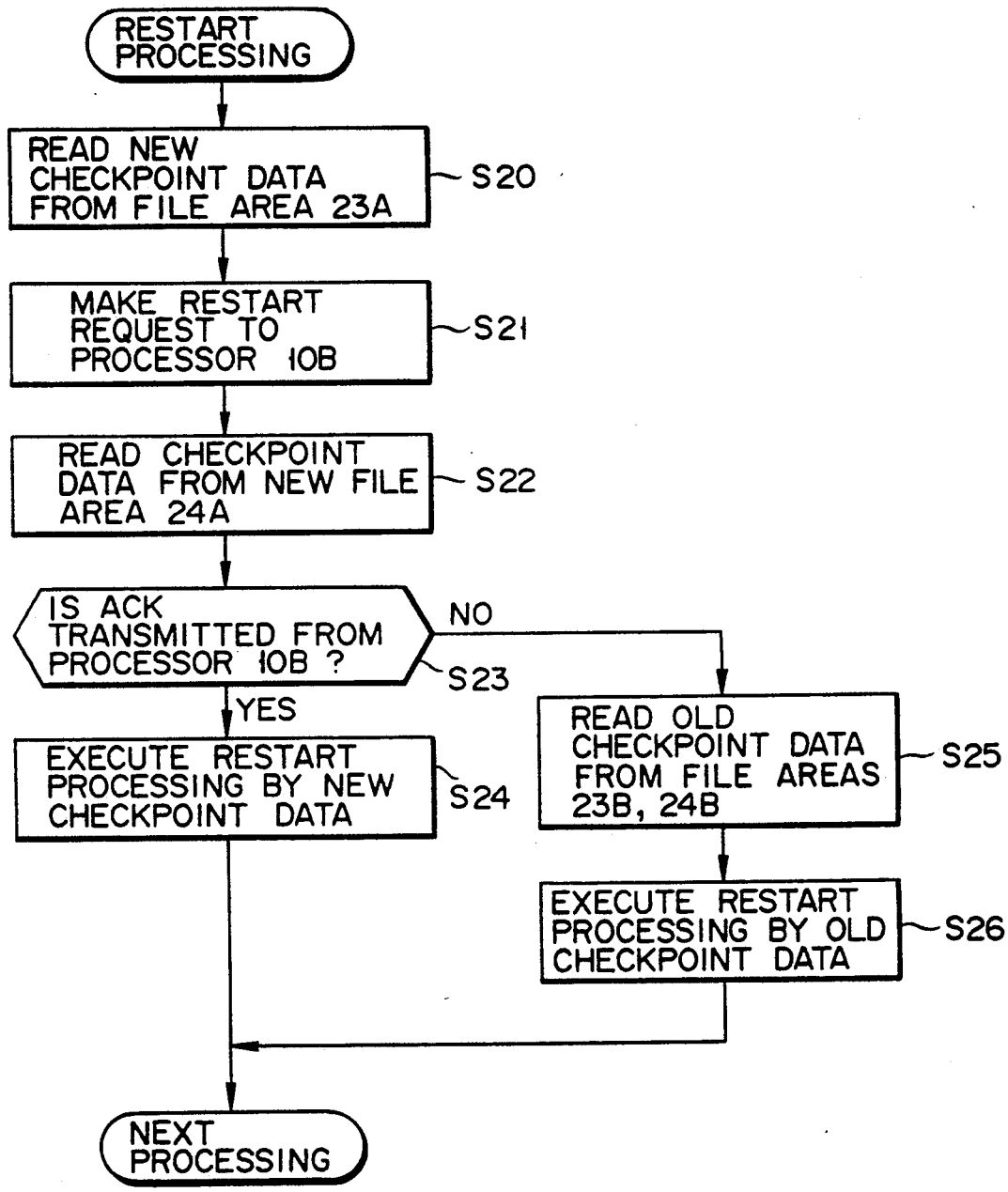
FIG. 5 is a flowchart for explaining the contents of the restart processing in the embodiment of FIG. 1.

When no ACK is transmitted from task 20B, on the other hand, restart processing task 21A is prompted by task 20 to execute the checkpoint restart process illustrated in FIG. 5 (step S7). In this case, in data processor 10A, a failure occurs in data communication with data processor 10B and the execution of the application program by CPU 13A is stopped to execute the restart process.

Next, the checkpoint restart process will be described with reference to FIG. 5.

First, restart processing task 21A of data processor 10A reads the new checkpoint data from file area 23A (step S20). Further, task 21A makes a restart request to restart processing task 21B of data processor 10B to execute a restart process based on the corresponding new checkpoint data (step S21). Responsive to the restart request from task 21A, task 21B reads the new checkpoint data from file area 24A (step S22). On success in reading the new checkpoint data from file area 24A, task 21B transmits an ACK to task 21A. No ACK will be transmitted when the reading of the new checkpoint data from file area 24A ends in failure. On receiving the ACK from task 21B of data processor 10B, task 21A of data processor 10A decides whether or not data processor 10B has normally received data (restart request) from data processor 10A (step S23).

On receiving the ACK from task 21B, task 21A executes the restart process on the basis of the new checkpoint data read from file area 23A (step S24). That is, CPU 13A restarts the application program which has been stopped from a restart point specified by the new checkpoint data. Likewise task 21B executes the restart process on the basis of the new checkpoint data read from file area 23A. That is, CPU 13B restarts the application program which has been stopped from a restart point specified by the new checkpoint data.

When no ACK is transmitted from task 21B, on the other hand, task 21A reads the old checkpoint data from file area 23B to execute the restart process on the basis of the old checkpoint data (steps S25 and S26). That is, CPU 13A restarts the program from a restart point specified by checkpoint data which has been collected prior to the new checkpoint data. Likewise task 21B reads the old checkpoint data from file area 24B to execute the restart process on the basis of the old checkpoint data. That is, CPU 13B restarts the program from a restart point specified by checkpoint data which has been collected prior to the new checkpoint data.

In this way, when a system failure occurs in the distributed processing system having data processors 10A and 10B, data processors 10A and 10B do not execute the checkpoint restart facilities independently of one another but instead execute the checkpoint restart facilities synchronously with one another. That is, in case where data processor 10A functions properly, but a system failure occurs in data processor 10B, data processor 10A executes the restart process based on the old checkpoint data together with data processor 10B. Accordingly, when data processor 10B cannot execute the restart process based on the new checkpoint data, data processor 10A executes the restart process based on the old checkpoint data, thereby executing the data processing in synchronization with data processor 10B.

As can been seen, where a system failure occurs in one of the data processors, in a distributed processing system which needs transmission and reception of data between data processors, transmission of currently unnecessary data from the properly functioning data processor to the malfunctioning data processor can surely be avoided. In other words, it is possible to implement transmission of currently necessary data between the data processors. As a result, the occurrence of malfunctions in data communications between the data processors can be avoided, thus improving the reliability of the distributed processing system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A distributed processing system with a restart processing function comprising:
   a first data processor and a second data processor, each executing a distributed processing;
   communication control means, installed in each said first processor and said second data processor, for allowing transmission and reception of data between said first data processor and said second data processor;
   checkpoint processing means, installed in each said first data processor and said second data processor, for determining new checkpoint data as current checkpoint data for executing restart processing when an ACK signal is transmitted from said second data processor to said first data processor in response to a request to collect said new checkpoint data made by said first data processor, and determining old checkpoint data as said current checkpoint data when no ACK signal is transmitted from said second data processor in response to said request made by said first data processor;
   data storage means, installed in each said first data processor and said second data processor, for storing the current checkpoint data determined by said checkpoint processing means; and
   restart processing means, installed in each said first data processor and said second data processor, for restarting execution of said distributed processing in accordance with said current checkpoint data stored in said data storage means.

2. A system according to claim 1, further comprising failure detecting means, installed in each said first data processor and said second data processor, for detecting a failure in at least one of said first data processor and said second data processor, said restart processing means responding to detection of a failure by said failure detecting means by executing said restart processing based on said current checkpoint data stored in said data storage means.

3. A distributed processing system with a restart processing function comprising:
   a first data processor and a second data processor, each executing a distributed processing;
   communication control means, installed in each said first data processor and said second data processor, for allowing transmission and reception of data between said first data processor and said second data processor;
   first checkpoint processing means, installed in each said first data processor and said second data processor, for generating old checkpoint data and new checkpoint data necessary for restart processing in accordance with a point at which said distributed processing is being executed;
   data storage means, installed in each said first data processor and said second data processor and having storage areas, for storing said old checkpoint data and said new checkpoint data generated by said first checkpoint processing mans;
   second checkpoint processing means for determining said new checkpoint data as current checkpoint data when an ACK signal is transmitted from said second data processor to said first data processor in response to a request to collect said new checkpoint data made by said first data processor, and determining said old checkpoint data as said current checkpoint data when no ACK signal is transmitted from said second data processor in response to said request made by said first data processor; and
   restart processing means, installed in each said first data processor and said second data processor, for restarting execution of said distributed processing in accordance with said current checkpoint data stored in said data storage means.

4. A system according to claim 3, further comprising failure detecting means installed in each said first data processor and said second data processor for detecting a failure in at least one of said first data processor and said second data processor, said restart processing means responding to detection of a failure by said failure detecting means to execute said restart processing based on said current checkpoint data stored in said data storage means.

5. A distributed processing system comprising:
a plurality of data processing apparatuses;
communication control means, installed in each of said data processing apparatuses, for controlling transmission and reception of data between said data processing apparatuses;
data storage means, installed in each of said data processing apparatuses, for storing new and old checkpoint data;
checkpoint processing means, installed in each of said data processing apparatuses, for storing first new checkpoint data in said data storage means for one of said data processing apparatuses and requesting that another of said data processing apparatuses collect second new checkpoint data in response to transferred data when said communication control means transfers data to said another of said data processing apparatuses, and for clearing old checkpoint data in response to an acknowledge signal representing that said another of said data processing apparatuses collected said second new checkpoint data accurately; and
restart processing means, installed in each of said data processing apparatuses, for reading one of said first new checkpoint data and said old checkpoint data from said data storage means and restarting processing based on read checkpoint data when said checkpoint processing means does not receive said acknowledge signal.

6. A system according to claim 5, in which said restart processing means reads said first new checkpoint data and requests said another of said data processing apparatuses to read said second new checkpoint data when said checkpoint processing means does not receive said acknowledge signal, and restarts processing based on said first new checkpoint data stored in said data storage means in response to another acknowledge signal representing that said another data processing apparatus collected said second new checkpoint data accurately.

* * * * *